(12) United States Patent
Wu et al.

(10) Patent No.: US 10,707,800 B2
(45) Date of Patent: Jul. 7, 2020

(54) MULTI-PULSE CONSTANT VOLTAGE TRANSFORMER FOR A VARIABLE SPEED DRIVE IN CHILLER APPLICATIONS

(71) Applicant: Johnson Controls Technology Company, Auburn Hills, MI (US)

(72) Inventors: Zhiqiao Wu, York, PA (US); John C. Hansen, Spring Grove, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 141 days.

(21) Appl. No.: 16/126,814

(22) Filed: Sep. 10, 2018

(65) Prior Publication Data

US 2019/0006976 A1    Jan. 3, 2019

Related U.S. Application Data

(63) Continuation of application No. 15/031,785, filed as application No. PCT/US2015/012193 on Jan. 21, 2015, now Pat. No. 10,075,117.
(Continued)

(51) Int. Cl.
*H02P 27/04* (2016.01)
*H01F 30/14* (2006.01)
(Continued)

(52) U.S. Cl.
CPC .......... *H02P 27/047* (2013.01); *F25B 49/025* (2013.01); *H01F 30/14* (2013.01);
(Continued)

(58) Field of Classification Search
USPC .............................................. 318/400.3, 780
See application file for complete search history.

(56) References Cited

U.S. PATENT DOCUMENTS

| 5,602,462 A | 2/1997 | Stich et al. |
| 5,604,423 A | 2/1997 | Degeneff et al. |

(Continued)

FOREIGN PATENT DOCUMENTS

| CN | 87104029 A | 3/1988 |
| CN | 101375490 A | 2/2009 |

(Continued)

OTHER PUBLICATIONS

Corner of single-phase, three-phase, special low-voltage transformer, Electrical Construction Materials & Instruments General Trading Company, Sanwa Denki Co., Ltd., http://web.archive.org/web/20100205100126/http://www.sanwa-denki.com:80/sale/tr/tr.htm.

(Continued)

*Primary Examiner* — Jorge L Carrasquillo
(74) *Attorney, Agent, or Firm* — Fletcher Yoder P.C.

(57) ABSTRACT

A multi-pulse transformer with multiple taps provides a constant magnitude voltage output to a variable speed chiller's compressor motor over a range of input voltages. The 3-phase transformer includes primary windings and a plurality of secondary windings. The secondary windings are electromagnetically coupled with the associated primary winding. The primary windings include taps for receiving multiple input AC voltages and the secondary windings have a single output terminal for supplying a predetermined output voltage which, after rectification produces a DC multi-pulse waveform for powering a DC link of a variable speed drive. Alternatively the 3-phase transformer includes multiple taps on the secondary windings. Each of the primary windings has a terminal for receiving an input AC voltage. The taps of the secondary windings provide an output voltage that is converted to a multi-pulse waveform for powering a DC link of a variable speed drive.

20 Claims, 6 Drawing Sheets

Related U.S. Application Data (60) Provisional application No. 61/934,918, filed on Feb. 3, 2014.

(51) Int. Cl.
  *H02M 1/14* (2006.01)
  *H02M 7/06* (2006.01)
  *F25B 49/02* (2006.01)
  *H02P 13/06* (2006.01)

(52) U.S. Cl.
  CPC ............. *H02M 1/14* (2013.01); *H02M 7/068* (2013.01); *H02P 13/06* (2013.01)

(56) References Cited

U.S. PATENT DOCUMENTS

| | | | |
|---|---|---|---|
| 5,625,545 | A | 4/1997 | Hammond |
| 7,129,784 | B2 | 10/2006 | Bhatti et al. |
| 8,279,640 | B2 | 10/2012 | Abolhassani et al. |
| 2009/0058854 | A1 | 3/2009 | Ingersoll et al. |
| 2009/0243535 | A1* | 10/2009 | Erdmann ............... H02P 3/18 318/813 |
| 2011/0216564 | A1* | 9/2011 | Swamy ............... H02M 7/08 363/126 |
| 2013/0121041 | A1* | 5/2013 | Schroeder ............. B60L 15/007 363/37 |
| 2013/0201727 | A1 | 8/2013 | Kolar et al. |
| 2015/0042253 | A1 | 2/2015 | Yoo |
| 2015/0236603 | A1* | 8/2015 | Jimichi ................ H02M 5/293 363/37 |

FOREIGN PATENT DOCUMENTS

| | | |
|---|---|---|
| CN | 101755179 A | 6/2010 |
| CN | 102165678 A | 8/2011 |
| CN | 102568799 A | 7/2012 |
| CN | 102884695 A | 1/2013 |
| JP | S56-065479 U | 6/1981 |
| JP | H11-122943 A | 4/1999 |
| JP | 2009171684 A | 7/2009 |
| JP | 2011502459 A | 1/2011 |
| WO | 2012129980 A1 | 10/2012 |

OTHER PUBLICATIONS

Skibinski, Gary L., Cost Effective Multi-Pulse Transformer Solutions for Harmonic Mitigation in AC Drives, Industry Application Society (IAS) conference, 2003, pp. 1-10, Rockwell Automation Drives Division, 6400 W. Enterprise Drive Mequon, WI 53092.

* cited by examiner

MULTI-PULSE CONSTANT VOLTAGE TRANSFORMER FOR A VARIABLE SPEED DRIVE IN CHILLER APPLICATIONS

CROSS-REFERENCE TO RELATED APPLICATIONS

This patent application is a continuation of U.S. patent application Ser. No. 15/031,785, filed Apr. 25, 2016, entitled "MULTI-PULSE CONSTANT VOLTAGE TRANSFORMER FOR A VARIABLE SPEED DRIVE IN CHILLER APPLICATIONS," which is a National Stage of PCT Application No. PCT/US2015/012193, filed Jan. 21, 2015, entitled "MULTI-PULSE CONSTANT VOLTAGE TRANSFORMER FOR A VARIABLE SPEED DRIVE IN CHILLER APPLICATIONS," which claims priority to and the benefit of U.S. Provisional Patent Application Ser. No. 61/934,918, filed Feb. 3, 2014, entitled "MULTI-PULSE CONSTANT VOLTAGE TRANSFORMER FOR A VARIABLE SPEED DRIVE IN CHILLER APPLICATIONS," which are hereby incorporated by reference in their entireties.

BACKGROUND

The application generally relates to a multiple pulse, or multi-pulse, transformer. The application relates more specifically to a multi-pulse transformer with multiple taps to provide a constant magnitude voltage output to a variable speed chiller's compressor motor over a range of input voltages.

AC-to-DC converters play a significant role in the modern energy conversion industry. Multi-pulse transformers (18 pulse, 24 pulse or others) along with full wave rectifiers have been used to reduce input current harmonic and meet industry guidelines for limits on voltage distortion, e.g., as may be caused by harmonics generated in the converter.

Manufacturers of computers and other digital equipment such as programmable controllers may require AC power sources having a harmonic distortion factor of no more than a 5%, and the largest single harmonic having no more than 3% of the rated RMS line voltage. Higher levels of harmonics may result in malfunctions of peripheral equipment that can have serious consequences. Instruments can be affected by providing erroneous data or otherwise performing outside the design criterion.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a variable speed drive system that receives an input AC power at a fixed AC input voltage magnitude and frequency and provides an output AC power at a variable voltage and variable frequency. The variable speed drive includes a multiple pulse transformer connected to a three-phase AC power source providing the input AC voltage. A converter converts the input AC voltage to a DC voltage. A DC link is connected to the converter stage. The DC link filters and stores the DC voltage from the converter stage. An inverter is connected to the DC link to convert the DC voltage from the DC link into the output AC power. The multiple pulse transformer includes three primary windings. Each of the primary windings is connected to a phase of the three-phase AC power source. Each of the primary windings includes a plurality of input taps for connection to the AC power source. The multiple pulse transformer also includes a plurality of secondary windings. Each secondary winding includes three phase windings respectively. Each phase winding of the respective secondary winding has a predetermined phase shift with respect to a corresponding phase winding of the remaining secondary windings. The phase shifting of the phase windings results in three sinusoidal output voltage waves for each secondary winding. The sinusoidal output voltage waves are substantially evenly spaced over 360 degrees.

Another embodiment relates to a variable speed drive system that receives an input AC power at a fixed AC input voltage magnitude and frequency and provide an output AC power at a variable voltage and variable frequency. The variable speed drive includes a multiple pulse transformer connected to a three-phase AC power source providing the input AC voltage. A converter configured to convert the input AC voltage to a DC voltage. A DC link is connected to the converter. The DC link filters and stores the DC voltage from the converter. An inverter is connected to the DC link to convert the DC voltage from the DC link into the output AC power having variable voltage and variable frequency. The multiple pulse transformer includes three primary windings connected to the three-phase AC power source. Each primary winding includes at least one input tap for connection to the AC power source. The multiple pulse transformer also includes a plurality of secondary phase windings. Each secondary phase winding includes multiple voltage output terminals.

Still another embodiment relates to a chiller system including a refrigerant circuit. The refrigerant circuit includes compressor, a condenser, and an evaporator connected in a closed refrigerant loop. A multiple pulse transformer includes three primary windings connected to a three-phase AC power source and a plurality of secondary windings connected to a variable speed drive to power a motor of the compressor. The primary windings or secondary windings include multiple taps for providing a multiple phase output voltage with a predetermined phase shift with respect to a corresponding winding of the remaining primary or secondary windings. The phase shifting of the multiple phase output voltage provides three multiple sinusoidal output voltage waves for each of the plurality of secondary windings, with the multiple sinusoidal output voltage waves being substantially evenly spaced over 360 degrees.

An advantage of the embodiments described herein include a multi-pulse transformer that has multiple taps either on the input winding or on the output winding such that AC output voltage with constant magnitude is obtained under different input voltage levels, for example 380 V input voltage, 460 V input voltage or etc.

Another advantage is a constant value of AC output voltage may be provided from a DC link in a variable speed drive with an optimal DC link voltage value. The DC link voltage is obtained after the AC input voltage is applied to multiple full wave rectifiers.

Another advantage is that for low voltage (600 Volts AC or less) HVAC applications, a 575 V 60 Hz motor may be used for all 380 to 600 Volt AC 50 and 60 Hz applications, which allows one family of motors for all applications globally, is most cost effective; maximizes the output rating in horsepower for a given insulated gate bipolar transistor (IGBT) inverter power pole; and minimizes the cost of the motor. This is because IGBTs are rated in amps, so a higher voltage motor increases the output horsepower rating. The use of a 575 V, four pole motor that is driven over a range of at least twice the power line input frequency could further reduce system cost and size for a given horsepower rating. For all input voltages ranging from 380 to 600 Volts AC, 50 and 60 Hz, if all compressor motors selected are rated at 575 Volts, 60 Hz, the DC link voltage could be fixed at 820 V.

A further advantage of the disclosed multi-pulse constant voltage transformer is to simplify variable speed drive design in global applications, since utility grid voltages vary from country to country.

Still other advantages provide by the use of a multi-pulse transformer in a variable speed drive include reduced input current harmonics, improved immunity to power quality issues, and increased efficiency over PWM rectifiers. Transformers are generally more efficient than PWM rectifiers since a PWM rectifier has switching and conducting losses associated with the IGBTs or other power semiconductor switching devices.

Alternative exemplary embodiments relate to other features and combinations of features as may be generally recited in the claims.

DETAILED DESCRIPTION OF THE EXEMPLARY EMBODIMENTS

Figure 1:
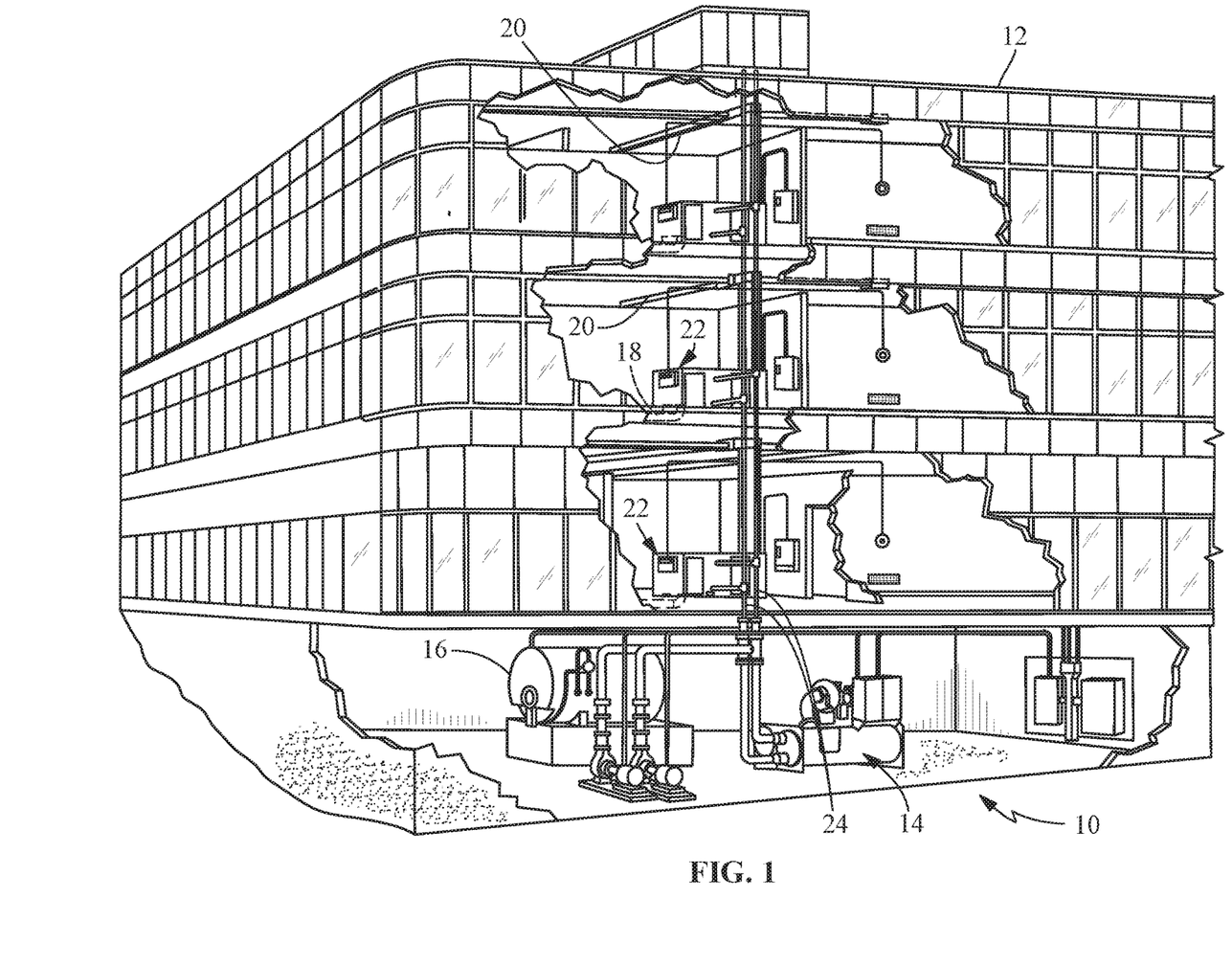
FIG. 1 shows an exemplary embodiment for a heating, ventilation and air conditioning system.

FIG. 1 shows an exemplary environment for a heating, ventilation and air conditioning (HVAC) system 10 in a building 12 for a typical commercial setting. System 10 can include a vapor compression system 14 that can supply a chilled liquid which may be used to cool building 12. System 10 can include a boiler 16 to supply a heated liquid that may be used to heat building 12, and an air distribution system which circulates air through building 12. The air distribution system can also include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
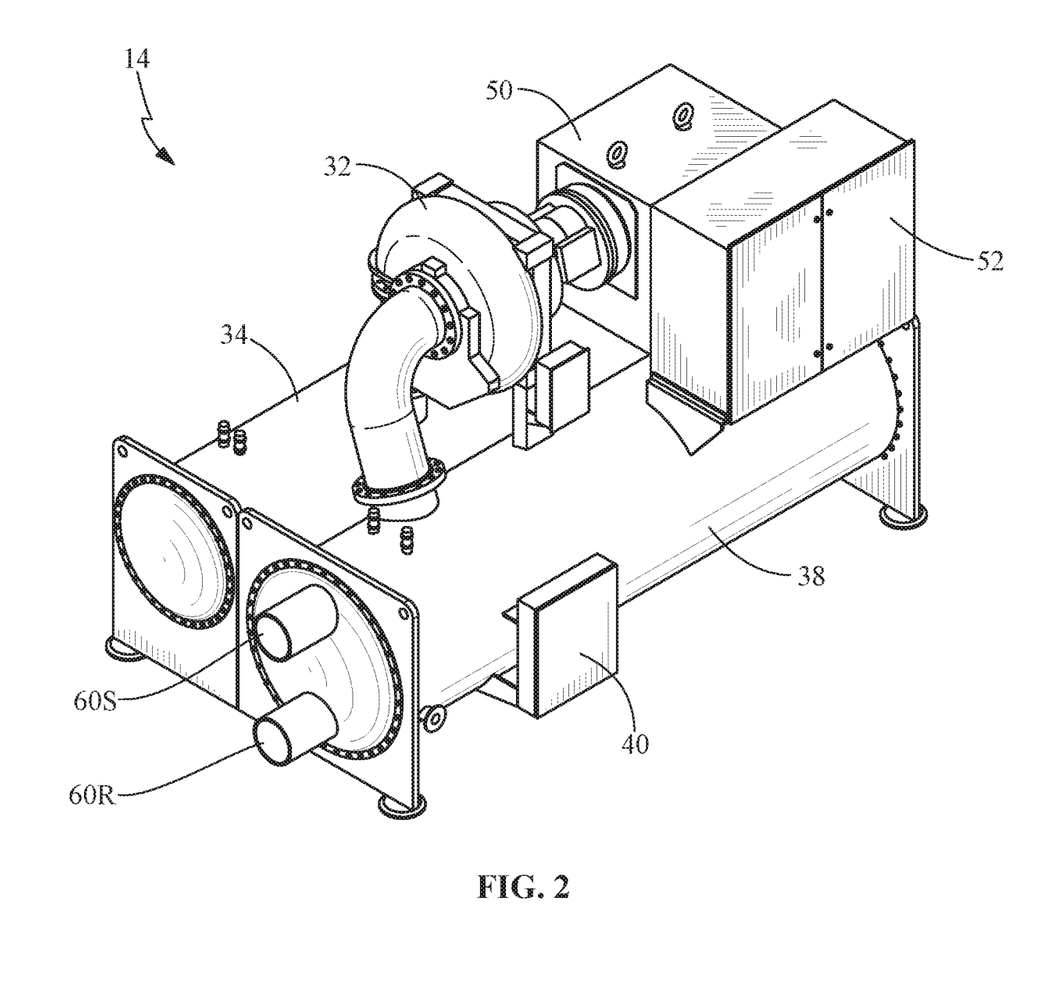
FIG. 2 shows an isometric view of an exemplary vapor compression system.
Figure 3:
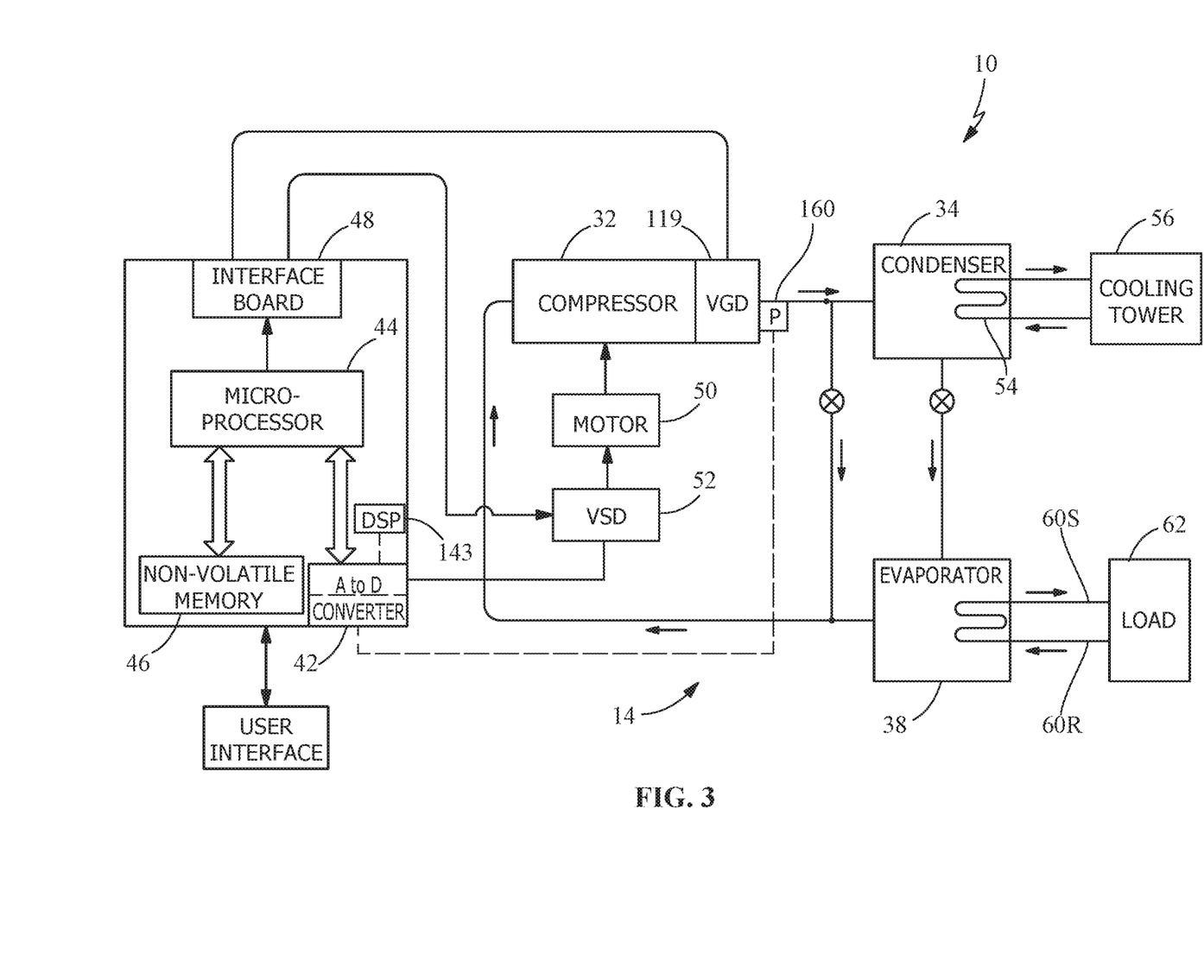
FIG. 3 shows schematically an exemplary embodiment for a heating, ventilation and air conditioning system.

FIGS. 2 and 3 show an exemplary vapor compression system 14 that can be used in HVAC system 10. Vapor compression system 14 can circulate a refrigerant through a circuit starting with compressor 32 and including a condenser 34, expansion valve(s) or device(s) 36, and an evaporator or liquid chiller 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant.

Motor 50 used with compressor 32 can be powered by a variable speed drive (VSD) 52 or can be powered directly from an alternating current (AC) or direct current (DC) power source. Motor 50 can include an induction, or synchronous motor, or switched reluctance (SR) motor, or permanent magnet synchronous motor (PMSM) that can be powered by a VSD or directly from an AC or DC power source.

Figure 4:
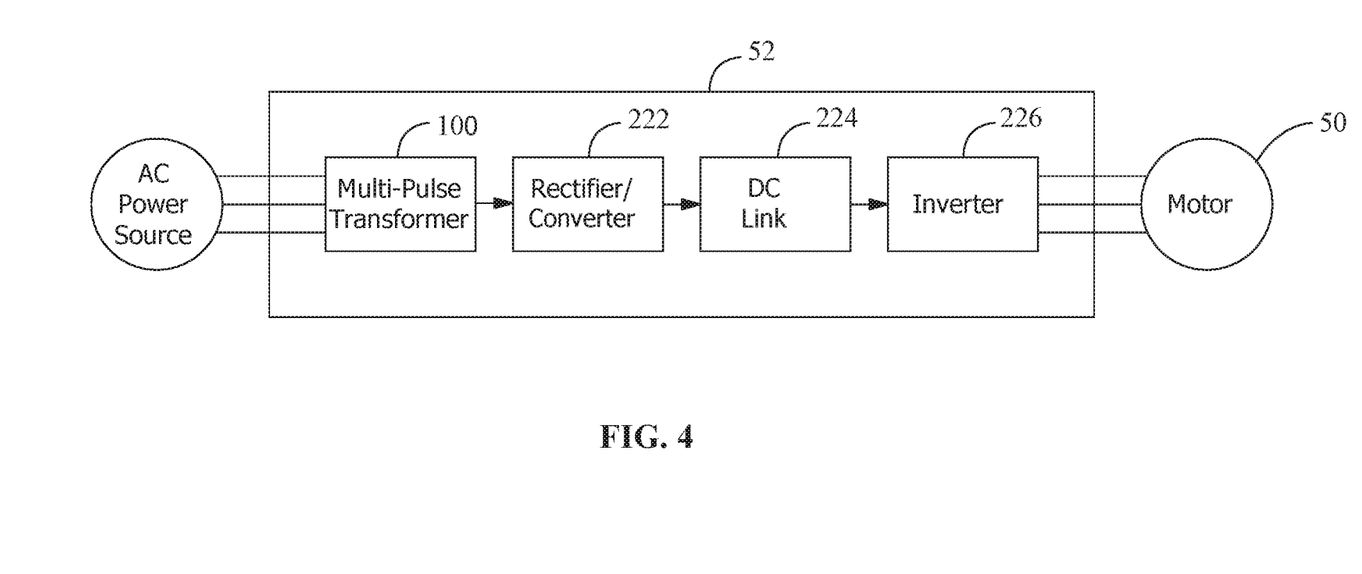
FIG. 4 shows schematically an exemplary embodiment of a variable speed drive.

FIG. 4 shows an exemplary embodiment of a VSD including a multiple pulse transformer 100. VSD 52 receives AC power having a particular fixed line voltage and fixed line frequency from an AC power source and provides AC power to motor 50 at a desired voltage and desired frequency, both of which can be varied to satisfy particular requirements. VSD 52 can have four components: a multiple pulse transformer, a rectifier/converter 222, a DC link 224 and an inverter 226. The multiple pulse transformer transforms a 3-phase input AC voltage into multiple AC or sinusoidal voltage waveforms as described in greater detail below. The rectifier/converter 222 converts the multiple sinusoidal voltage waveforms from the multiple pulse transformer 100 into DC voltage. The DC link 224 filters the DC power from the converter 222 and provides energy storage components such as capacitors and/or inductors. Finally, inverter 226 converts the DC voltage from DC link 224 into variable frequency, variable magnitude AC voltage for motor 50.

In an exemplary embodiment, the rectifier/converter 222 may be a three-phase pulse width modulated boost rectifier having insulated gate bipolar transistors to provide a boosted DC voltage to the DC link 224 to obtain a maximum RMS output voltage from VSD 52 greater than the input voltage to VSD 52. Alternately, the converter 222 may be a passive diode or thyristor rectifier without voltage-boosting capability.

VSD 52 can provide a variable magnitude output voltage and variable frequency to motor 50, to permit effective operation of motor 50 in response to a particular load conditions. Control panel 40 can provide control signals to VSD 52 to operate the VSD 52 and motor 50 at appropriate operational settings for the particular sensor readings received by control panel 40. For example, control panel 40 can provide control signals to VSD 52 to adjust the output voltage and output frequency provided by VSD 52 in response to changing conditions in vapor compression system 14, i.e., control panel 40 can provide instructions to increase or decrease the output voltage and output frequency provided by VSD 52 in response to increasing or decreasing load conditions on compressor 32. The estimated rotor phase angle $\theta_r$ and rotor frequency $\omega_r$, of motor 50, as described in more detail below, may be input to the control panel for feedback control of the position and rotational frequency of motor 50.

Compressor 32 compresses a refrigerant vapor and delivers the vapor to condenser 34 through a discharge passage. In one exemplary embodiment, compressor 32 can be a centrifugal compressor having one or more compression stages. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. A hot gas bypass valve (HGBV) 134 may be connected in a separate line extending from compressor discharge to compressor suction. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle 60 having a supply line 60S and a return line 60R connected to a cooling load 62. A process fluid, for example, water, ethylene glycol, calcium chloride brine, sodium chloride brine, or any other suitable liquid, enters evaporator 38 via return line 60R and exits evaporator 38 via supply line 60S. Evaporator 38 lowers the temperature of the process fluid in the tubes. The tube bundle 60 in evaporator 38 can include a plurality of tubes and a plurality of tube bundles. The vapor refrigerant exits evaporator 38 and returns to compressor 32 by a suction line to complete the circuit or cycle. In an exemplary embodiment, vapor compression system 14 may use one or more of each of variable speed drive (VSD) 52, motor 50, compressor 32, condenser 34, expansion valve 36 and/or evaporator 38 in one or more refrigerant circuits.

Figure 5:
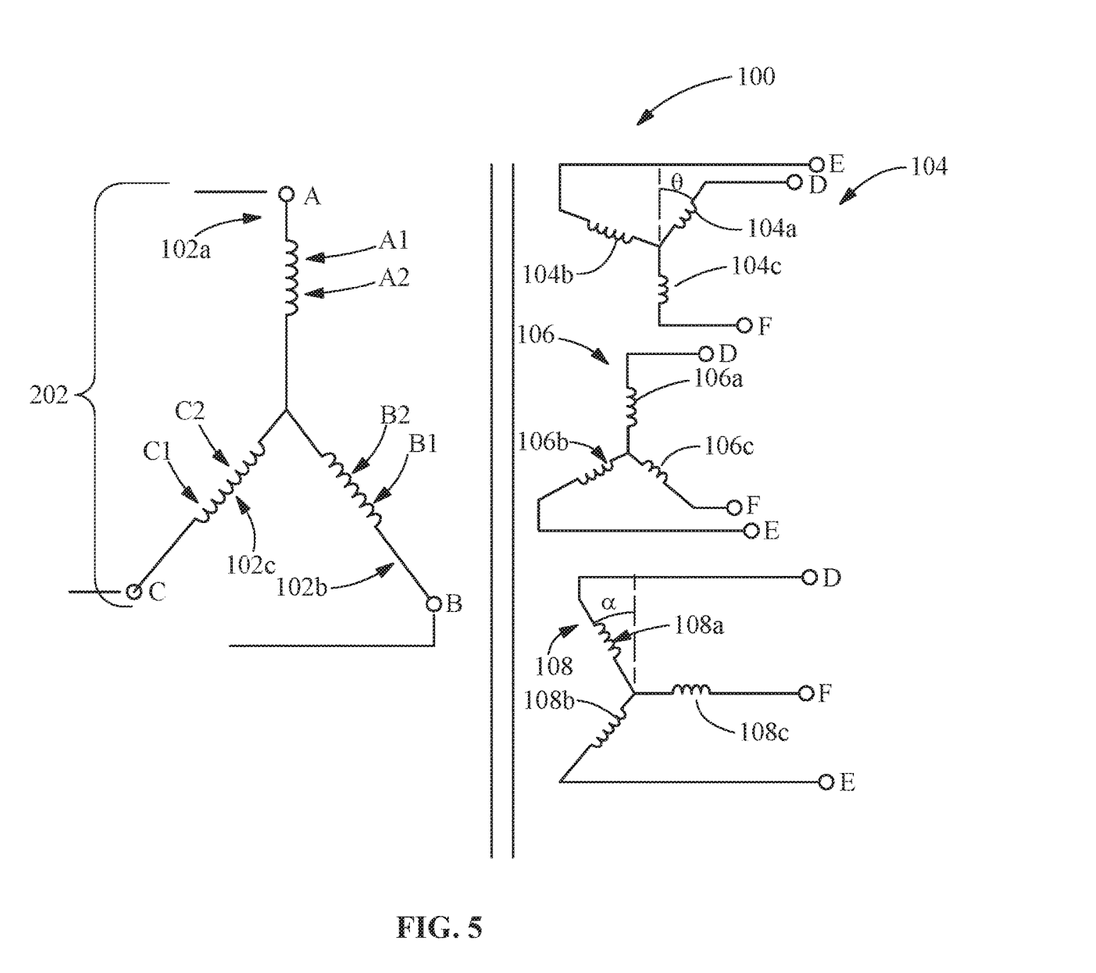
FIG. 5 shows an exemplary multi-pulse transformer with multiple tap primary windings.

Referring next to FIG. 5, an exemplary multi-pulse transformer 100 includes input or primary windings 102a, 102b and 102c for connection to a three-phase input power source 104. Each of input windings 102a, 102b and 102c includes multiple terminals for connection to input power source 104. In the exemplary embodiment shown in FIG. 5 there are three terminals on each input winding, indicated as terminals A, A1 and A2 on winding 102a; terminals B, B1 and B2 on winding 102b, and terminals C, C1 and C2 on winding 102c.

Transformer 100 further includes output or secondary windings 104, 106 and 108, each of which has three phase windings designated as a, b and c, respectively. As indicated in FIG. 5, secondary phase winding 104a has a phase shift of Θ with respect to secondary phase winding 106a, and secondary winding 108a has a phase shift of −Θ respect to secondary winding 106a. Similarly each of the respective output windings 104b, 106b, and 108b is phase shifted +/−Θ respect to the adjacent phase, and each of output windings 104c, 106c and 108c is phase shifted +/−Θ. Phase shifting of secondary windings 104, 106 and 108 and their respective phase windings results in nine sine waves at the output terminals D, E, F, respectively of phase windings 104 a, b & c; 106 a, b & c, and 108 a, b & c, respectively at substantially equally spaced phase angles, or at about 40° angles of separation between voltage peaks. When rectified by rectifier/converter 222, the resulting wave form results in an 18 pulse DC waveform supplied to DC link 224. While the exemplary embodiments as described are for 18 pulse (9 phase) output waveform, it should be understood that other configurations, e.g., 12-pulse (6-phase), 24-pulse (12-phase), as desired to achieve the desired ripple factor available at the DC link.

In the exemplary embodiment shown in FIG. 5, input windings 102 may be wound for input terminals arranged as follows:
575 Volts→terminals A, B & C
460 Volts→terminals A1, B1 & C1
400/415 Volts→terminals A2, B2 & C2

Thus, depending on the utility voltage available at input power source 104, any of the three voltages above may be applied at the respective terminals to provide the same output voltage at the output terminals of secondary phase windings, e.g., 580 VAC RMS voltage in order to convert the output voltage of secondary phase windings to 820 VDC on the DC link. As indicated above, it is common to use a 575 volt motor for HVAC applications to maximize output power for a given IGBT inverter power pole. A 575 V, four pole motor may be driven over a range of at least twice the power line input frequency to reduce system cost and size for a given motor horsepower rating. For a 575 V induction machine, the preferred DC link voltage is 820 V, although transformer 100 may be designed to provide various DC bus voltages, e.g., in a range of 813 V up to 1000 V, suitable for motor voltage ratings of 575 volts.

Figure 6:
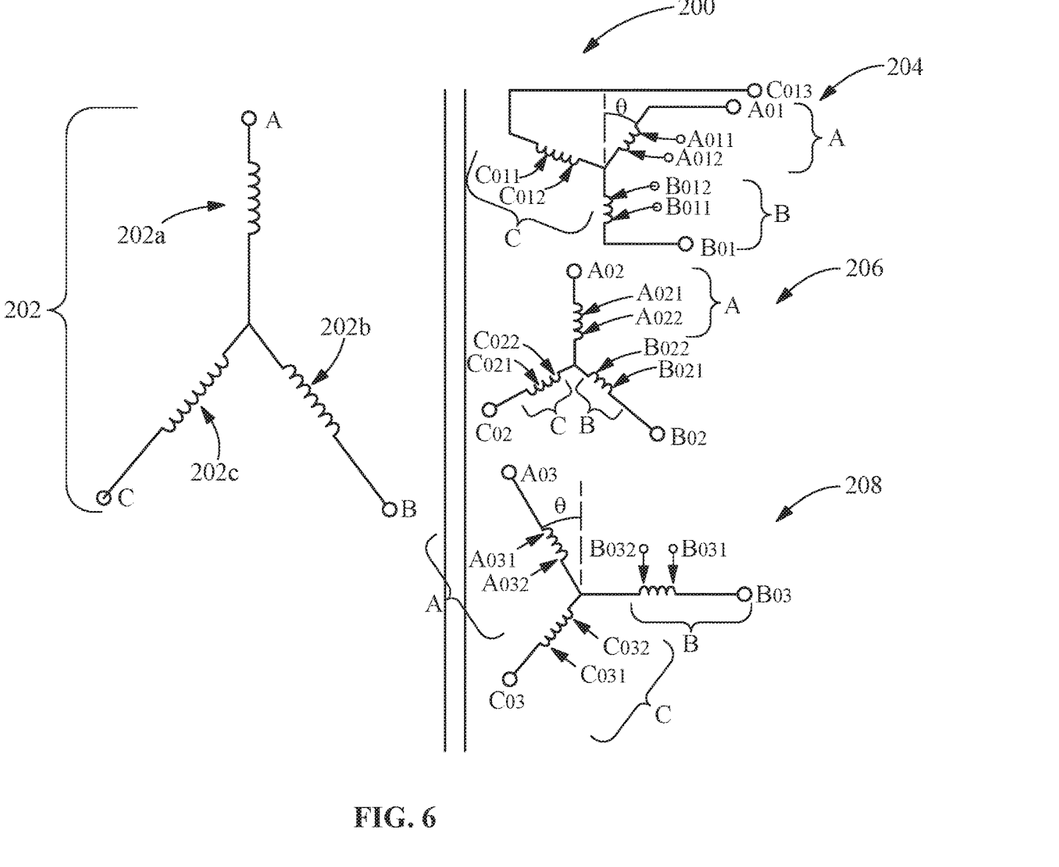
FIG. 6 shows an exemplary multi-pulse transformer with multiple tap secondary windings.

Referring next to FIG. 6, in an alternate embodiment an exemplary multi-pulse transformer 200 having secondary windings with multiple taps is shown. In another embodiment multiple taps may be provided on the output winding 204, 206, 208 such that AC output voltage is maintained with constant magnitude is obtained under different input voltage levels, for example 380 V input voltage, 460 V input voltage or etc. In an embodiment where secondary windings include multiple taps, primary windings 202 may include only one terminal connection to the input voltage. Alternately primary windings 202 may also include multiple taps.

Multi-pulse transformer 200 includes input or primary windings 202 with 3-primary phase windings 202a, 202b and 202c for connection to a three-phase input power source 202. As shown in FIG. 6, each input winding 202a, 202b and 202c includes a single input terminal $A_i$, $B_i$, $C_i$, respectively, for connection to input power source 202.

Transformer 200 further includes output or secondary windings 204, 206 and 208, each of which has three output phase windings with multiple terminals. On output winding 204, phase A terminals are designated as $A_{O1}$, $A_{O11}$, and $A_{O12}$; phase B terminals as $B_{O1}$, $B_{O11}$, and $B_{O12}$ and phase C terminals as $C_{O1}$, $C_{O11}$, and $C_{O12}$, respectively. On output winding 206, phase A terminals are designated as $A_{O2}$, $A_{O21}$, and $A_{O22}$; phase B terminals as $B_{O2}$, $B_{O21}$, and $B_{O22}$ and phase C terminals as $C_{O2}$, $C_{O21}$, and $C_{O22}$, respectively; On output winding 208, phase A terminals are designated as $A_{O3}$, $A_{O31}$, and $A_{O32}$; phase B terminals as $B_{O3}$, $B_{O31}$, and $B_{O32}$ and phase C terminals as $C_{O3}$, $C_{O31}$, and $C_{O32}$, respectively. As indicated in FIG. 6, secondary phase winding 204A has a phase shift of Θ with respect to secondary phase winding 206A, and secondary winding 208A has a phase shift of −Θ with respect to secondary winding 206A. Similarly each of the respective output windings 204B, 206B, and 208B is phase shifted +/−Θ with respect to the adjacent phase, and each of output windings 204C, 206C and 208C is phase shifted +/−Θ with respect to the adjacent phase. Phase shifting of secondary windings 204, 206 and 208 and their respective phase windings results in nine sine waves at the output terminals D, E, F, respectively of phase windings 204 A, B & C; 206 A, B & C, AND 208 A, B & C, respectively at substantially equally spaced phase angles, or at about 40° angles of separation between voltage peaks. When rectified by rectifier/converter 222, the resulting wave form results in an 18 pulse waveform supplied to DC link 224.

In the exemplary embodiment shown in FIG. 6, input windings 202 may be wound for a standard input AC voltage, and the output terminals arranged to output 575 Volts at one of the 3 terminal options, depending on the standard input AC voltage, e.g., 575 V, 460 V or 400/415 V, applied at terminals 202 $A_i$, $B_i$, $C_i$.

Thus, depending on the utility voltage provided at input power source 202, any of the three voltages above applied at the input terminals will provide the desired output voltage at one the output terminal combinations of secondary phase windings, e.g., 575 volts for a 575 V motor. As indicated above, it is common to use a 575 volt motor for HVAC applications to maximize output power for a given IGBT inverter power pole.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the multi-pulse transformer as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A variable speed drive system, comprising:
   a multiple pulse transformer connected to a three-phase AC power source configured to provide an input AC voltage;
   a converter configured to convert the input AC voltage to a DC voltage;
   a DC link connected to the converter, wherein the DC link is configured to filter and store the DC voltage from the converter; and
   an inverter connected to the DC link, wherein the inverter is configured to convert the DC voltage from the DC link into output AC power having a variable voltage and a variable frequency;
   wherein the multiple pulse transformer comprises:
   three primary windings, each of the primary windings connected to a phase of the three-phase AC power source, each of the primary windings comprising a plurality of input terminals, wherein a first input terminal of the plurality of input terminals is wound for a first utility voltage available at the three-phase AC power source and a second input terminal of the plurality of input terminals is wound for a second utility voltage available at the three-phase AC power source, and wherein the first utility voltage is different than the second utility voltage; and
   a plurality of secondary windings, each secondary winding comprising three phase windings, respectively, and each secondary winding comprising multiple voltage output terminals.

2. The variable speed drive system of claim 1, wherein the multiple pulse transformer comprises a multiple pulse isolation transformer.

3. The variable speed drive system of claim 1, wherein each phase winding of each respective secondary winding comprises a predetermined phase shift with respect to a corresponding phase winding of the remaining secondary windings.

4. The variable speed drive system of claim 3, wherein the plurality of secondary windings comprises a first secondary winding, a second secondary winding, and a third secondary winding, and the first secondary winding comprises a phase angle shift of $-\theta$ with respect to the second secondary winding, and a phase angle shift of $+\theta$ with respect to the third secondary winding.

5. The variable speed drive system of claim 4, wherein the converter is configured to rectify nine sinusoidal output voltage waves from the plurality of secondary windings to generate an 18-pulse DC waveform supplied to the DC link.

6. The variable speed drive system of claim 4, wherein each secondary winding of the plurality of secondary windings is configured to generate a sinusoidal output voltage wave comprising 12-pulses and 6-phases to achieve a predetermined ripple factor at the DC link.

7. The variable speed drive system of claim 4, wherein each secondary winding of the plurality of secondary windings is configured to generate a sinusoidal output voltage wave comprising 24-pulses and 12-phases to achieve a predetermined ripple factor at the DC link.

8. The variable speed drive system of claim 1, wherein the first utility voltage is 575 Volts, the second utility voltage is 460 Volts, and a third input terminal of the plurality of input terminals is wound for a third utility voltage at the three-phase AC power source, wherein the third utility voltage is 400 to 415 Volts, and wherein any of the respective voltage levels may be applied at the respective input terminals to provide a fixed secondary voltage at output terminals of the associated secondary windings.

9. The variable speed drive system of claim 1, comprising a control panel configured to output a control signal to the variable speed drive system to adjust the output AC power based on feedback indicative of a condition of a vapor compression system.

10. The variable speed drive system of claim 9, wherein the feedback indicative of the condition of the vapor compression system comprises a load condition of a compressor of the vapor compression system.

11. A variable speed drive system, comprising:
   a multiple pulse transformer connected to a three-phase AC power source configured to provide input AC voltage;

a converter configured to convert the input AC voltage to a DC voltage;

a DC link connected to the converter, wherein the DC link is configured to filter and store the DC voltage from the converter;

an inverter connected to the DC link, wherein the inverter is configured to convert the DC voltage from the DC link into output AC power having a variable voltage and a variable frequency; and a control panel configured to output a control signal to the variable speed drive system to adjust the output AC power based on feedback indicative of a condition of a vapor compression system;

wherein the multiple pulse transformer comprises:

three primary windings, each of the primary windings connected to a phase of the three-phase AC power source, each of the primary windings comprising a plurality of input terminals for connection to the three-phase AC power source, wherein a first input terminal of the plurality of input terminals is wound for a first utility voltage available at the three-phase AC power source, and a second input terminal of the plurality of input terminals is wound for a second utility voltage available at the three-phase AC power source, and wherein the first utility voltage is different than the second utility voltage; and a plurality of secondary phase windings, each secondary phase winding having multiple voltage output terminals.

12. The variable speed drive system of claim 11, wherein the multiple pulse transformer comprises a multiple pulse isolation transformer.

13. The variable speed drive system of claim 11, wherein each secondary phase winding of the plurality of secondary phase windings has a phase angle shift of $\theta$ with respect to a first adjacent secondary phase winding and has a phase angle shift of $-\theta$ with respect to a second adjacent secondary winding.

14. The variable speed drive system of claim 13, wherein the phase angle shift between each of the secondary phase windings of the plurality of secondary phase windings generates nine sinusoidal voltage waves at the multiple voltage output terminals respectively of the secondary phase windings.

15. The variable speed drive system of claim 14, wherein the phase angle shift between each of the secondary phase windings of the plurality of secondary phase windings is about 40° angle of separation between sinusoidal voltage waves.

16. The variable speed drive system of claim 14, wherein the converter is configured to rectify the nine sinusoidal output voltage waves to generate an 18-pulse DC waveform supplied to the DC link.

17. The variable speed drive system of claim 14, wherein the multiple voltage output terminals are arranged to output 575 Volts on at least one of the multiple voltage output terminals.

18. A chiller system, comprising:

a refrigerant circuit comprising a compressor, a condenser, and an evaporator connected in a closed refrigerant loop;

a converter;

a DC link connected to the converter;

an inverter connected to the DC link; and a multiple pulse transformer comprising three primary windings connected to a three-phase AC power source and a plurality of secondary windings connected to a variable speed drive to power a motor of the compressor, wherein each of the primary windings comprises a plurality of input terminals for connection to the three-phase AC power source, wherein a first input terminal of the plurality of input terminals is wound for a first utility voltage available at the three-phase AC power source, and a second input terminal of the plurality of input terminals is wound for a second utility voltage available at the three-phase AC power source, wherein the first utility voltage is different than the second utility voltage, and wherein each secondary winding comprises multiple voltage output terminals.

19. The chiller system of claim 18, wherein the multiple pulse transformer comprises a multiple pulse isolation transformer.

20. The chiller system of claim 18, wherein the first utility voltage is 575 Volts, the second utility voltage is 460 Volts, and a third input terminal of the plurality of input terminals is wound for a third utility voltage at the three-phase AC power source, wherein the third utility voltage is 400 to 415 Volts.

* * * * *